United States Patent
Sheng

[11] Patent Number: 6,161,573
[45] Date of Patent: Dec. 19, 2000

[54] AIR PRESSURE REGULATOR

[76] Inventor: Chih-Sheng Sheng, No. 100, Tzu Chiang W. Road, Kweishan Hsiang, Tao-Yuan Hsien, Taiwan

[21] Appl. No.: 09/311,709

[22] Filed: May 13, 1999

[51] Int. Cl.$^7$ .................................................. G05D 16/10
[52] U.S. Cl. ............................... 137/505.41; 137/505.42; 137/906
[58] Field of Search .................. 137/505.41, 505.42, 137/906

[56] References Cited

U.S. PATENT DOCUMENTS

| | | | |
|---|---|---|---|
| 337,431 | 3/1886 | Pintsch | 137/505.41 |
| 2,163,597 | 6/1939 | Grove | 137/906 X |
| 2,202,313 | 5/1940 | Grove | 137/505.42 |
| 2,595,156 | 4/1952 | Matasovic | 137/505.42 |
| 4,915,127 | 4/1990 | Werley | 137/505.42 |

*Primary Examiner*—Stephen M. Hepperle
*Attorney, Agent, or Firm*—Rosenberg, Klein & Lee

[57] ABSTRACT

The present invention relates to an air pressure regulator, characterized in that a regulator made of a piston body connected with a return spring is disposed at the top of a main body, wherein the high-pressure gas flowing from the primary pressure chamber to the secondary pressure chamber can be controlled by means that the secondary pressure inside of the closed space created by the piston body and the top of the main body exerts a stable and balanced effect on the piston body which raises or lowers the plug assembly, and that a stable output and a high accuracy of the secondary pressure can be ensured by means that the resilience of the return spring and the gas pressure creates a coordination effect without being influenced by the pressure difference created by the change of the internal pressure inside steel cylinder after bottling, so that the using life thereof can be extended and its safety can also be enhanced.

1 Claim, 8 Drawing Sheets

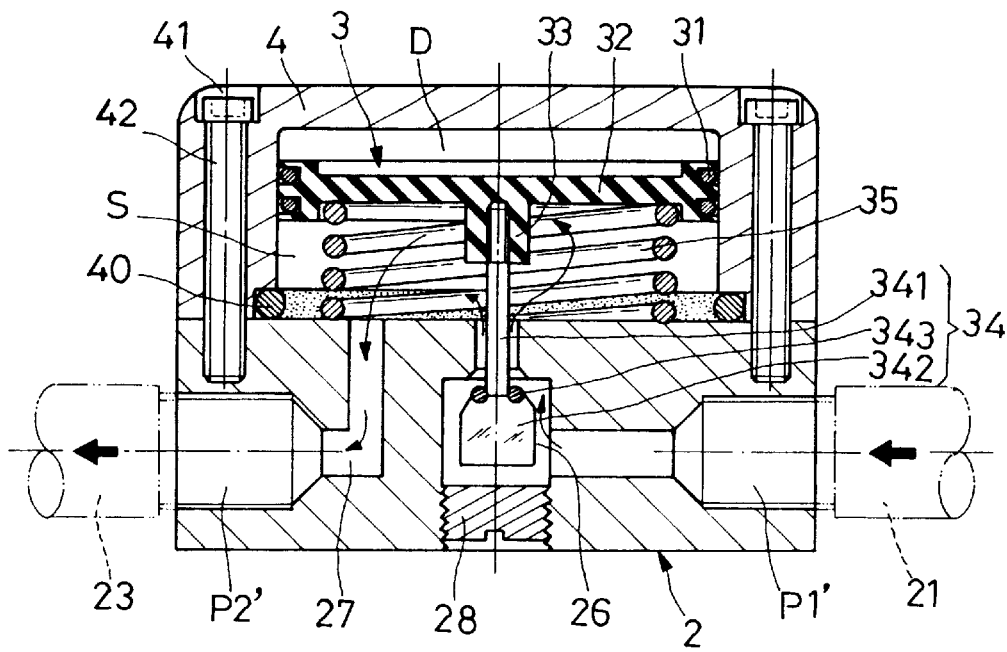
F I G. 6
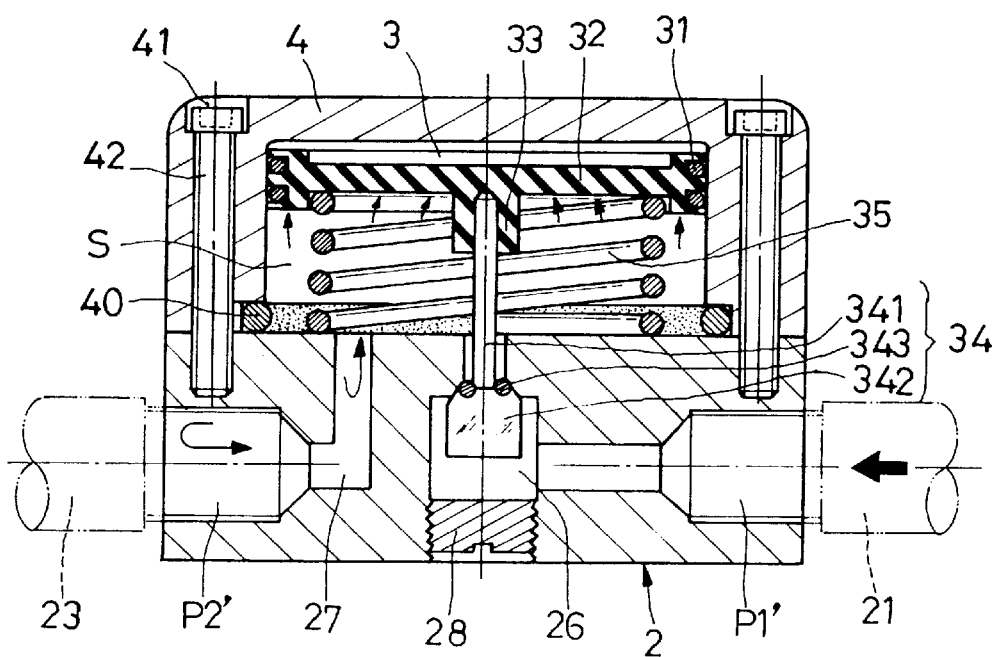
F I G. 7

AIR PRESSURE REGULATOR

BACKGROUND OF THE INVENTION

1. Field of the Invention

The present invention relates to an air pressure regulator, and more particularly to a piston body, wherein a stable output and a high accuracy of the secondary pressure can be ensured without gas leakage and without changing the output pressure influenced by the primary pressure amount by means that both the resilience of the return spring connected thereto and the high-pressure gas create a coordination effect.

2. Description of the Prior Art

Conventionally, some gases, e.g. oxygen, acetylene, nitrogen, argon etc. are bottled in high pressure for the use in the industry. Before the bottled high-pressure gas is used, the gas pressure must be adjusted to an appropriate extent by means of an air pressure regulator so as to ensure a normal use and safety of the instrument piping, tools and equipment. The main function of the air pressure regulator is to stabilize the output of the secondary pressure.

FIGS. 1 through 4 show a conventional air pressure regulator. The inside of the main body 1 screwed with an upper cover 11 is divided into a primary pressure chamber P1 and a secondary pressure chamber P2. The primary pressure chamber P1 is connected with an air inlet pipe 12 and a primary pressure gauge 13 while the secondary pressure chamber P2 is connected with an air outlet pipe 14, a secondary pressure gauge 15 and safety valve 16. A valve 17 with a small spring 171 at the bottom thereof is provided between the primary and secondary pressure chamber P1, P2 to control the opening and closing of the passage. Furthermore, an accommodation 111 is formed in the middle of the upper cover 11 while a flange is disposed at the lower end thereof which is connected with an elastomer piece 18 so as to couple with the valve 17 for a synchronic motion, whereby the secondary pressure chamber P2 and the accommodation 111 are separated. Thereafter, a screw through hole is provided at the top of the upper cover 11 for installing an adjusting screw 113 elongating into the accommodation 111 fitted with a large spring 19 whose upper end is provided with a packing piece 191 pressed by the adjusting screw 113 while the lower end thereof is suppressed on a metallic packing piece 181 disposed in the middle of the elastomer piece 18.

However, the pressure of the secondary pressure chamber P2 is adjusted by means of the adjusting screw 113 in the knob 114 adjusting the position of the large spring 19 so as to create pressure suppressing the curved position of the elastomer piece 18. Furthermore, it also controls the opening and closing of the valve 17 to form a loop and commands the high-pressure gas flowing from the primary pressure chamber P1 to the secondary pressure chamber P2. When the gas pressure in the secondary pressure chamber P2 is greater than that of the large spring 19 at the top of the elastomer piece 18, as shown in FIG. 4, it will be deformed to be curve-shaped. At this time, the valve 17 will rise through the resilience of the small spring 171 at the bottom thereof to close the valve hole 172 of the primary pressure chamber P1. When the pressure in the air outlet pipe 14 is released, the pressure in the secondary pressure chamber P2 will be lowered. At this time, the elastomer piece 18 will be pushed by the resilience of the great spring 19 and deformed again and restored to be a curved shape, as shown in FIG. 3. The top rod 173 of the valve 17 is suppressed by the metallic packing piece 181 in the middle thereof to be lowered so that the valve hole 172 is open to let the gas in the primary pressure chamber P1 flow into the secondary pressure chamber P2 again. In accordance with the above-mentioned procedure, the pressure in the secondary pressure chamber P2 are unceasingly adjusted and controlled for ensuring a desired pressure output.

Therefore, the elastomer piece 18 is unceasingly deformed. As it owns the elasticity, it will age and easily loses its elastic feature after a longer using period. If it is used in the corrosive gas, it's likely to cause leakage of the poisonous gas. Besides, the elastomer piece 18 is frequently produced with an uneven thickness so that it's likely to result in deformity at the thinner position, whereby the area of thrust surface is also influenced.

Moreover, the output of the secondary pressure is adjusted by means of the flexible elastomer piece 18 controlled by the large spring 19 and the metal packing piece 181 adjustable through the adjusting screw 113 of the knob 114, so that the adjustment at an exact position can't be ensured. In addition, the high pressure in the steel cylinder will be changed with using, e.g. the pressure in the steel cylinder full bottled with high-pressure gas is 150 kg/cm$^2$. When it runs out, it's likely that only 10 kg/cm$^2$ of the pressure remains. Such a huge pressure difference will result in the unstable pressure output of the primary pressure chamber P1 and also easily influences the valve 17 in the primary pressure chamber P1 and the small spring 171 at the bottom thereof. The resilience of the small spring 171 controlling the rise of the valve 17 is very slight so that the influence of the pressure difference upon the valve is relatively huge and the accuracy to control the gas flow will be influenced as well. It's an inevitable disadvantage. Finally, the flexible elastomer piece 18 will be shaken upwards and downwards to be deformed due to the negative pressure and the pressure instability.

SUMMARY OF THE INVENTION

It is the main object of the present invention to provide an air pressure regulator, wherein a regulator made of a piston body connected with a return spring is disposed at the top of a main body, and wherein the gas flow is controlled by making use of the automatic balanced resilient feature of the return spring at different pressure and by coupling a piston body with a plug assembly situated in a primary pressure chamber for an upward and downward synchronic motion; furthermore, a stable output and a high accuracy of the secondary pressure can be ensured by means of a regulating configuration making use of the positive pressure and pressure balance and can be without being influenced by the pressure difference created by the change of the internal pressure inside steel cylinder after bottling.

It is another object of the present invention to provide an air pressure regulator applicable to both fixed and adjustable pressure types.

It is a further object of the present invention to provide an air pressure regulator having long using life and being uneasy for gas leakage to secure more safety.

BRIEF DESCRIPTION OF THE DRAWINGS

The drawings disclose illustrative embodiments of the present invention which serves to exemplify the various advantages and objects hereof, and are as follows:

FIG. 6 is a longitudinal section of the applicable embodiment in accordance with the present invention, illustrating the plug assembly in an open state;

FIG. 7 is a longitudinal section of the applicable embodiment in accordance with the present invention, illustrating the plug assembly in a close state;

DETAILED DESCRIPTION OF THE PREFERRED EMBODIMENT

Figure 1:
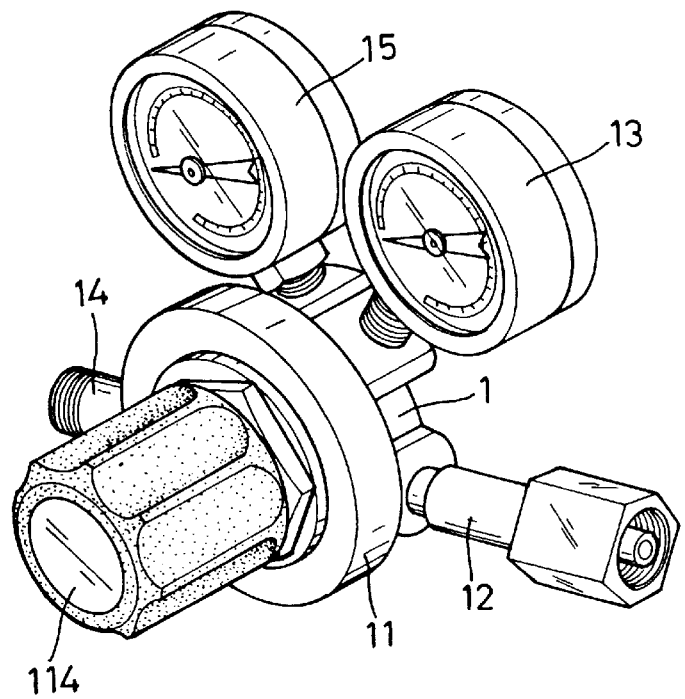
FIG. 1 is a perspective view of a conventional air pressure regulator.
Figure 2:
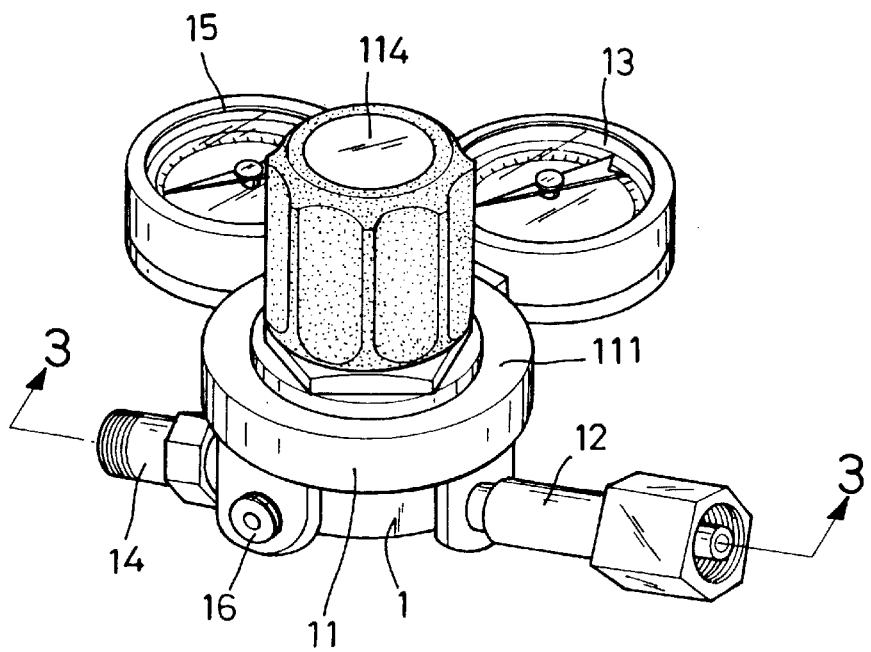
FIG. 2 is another perspective view of the conventional air pressure regulator.
Figure 3:
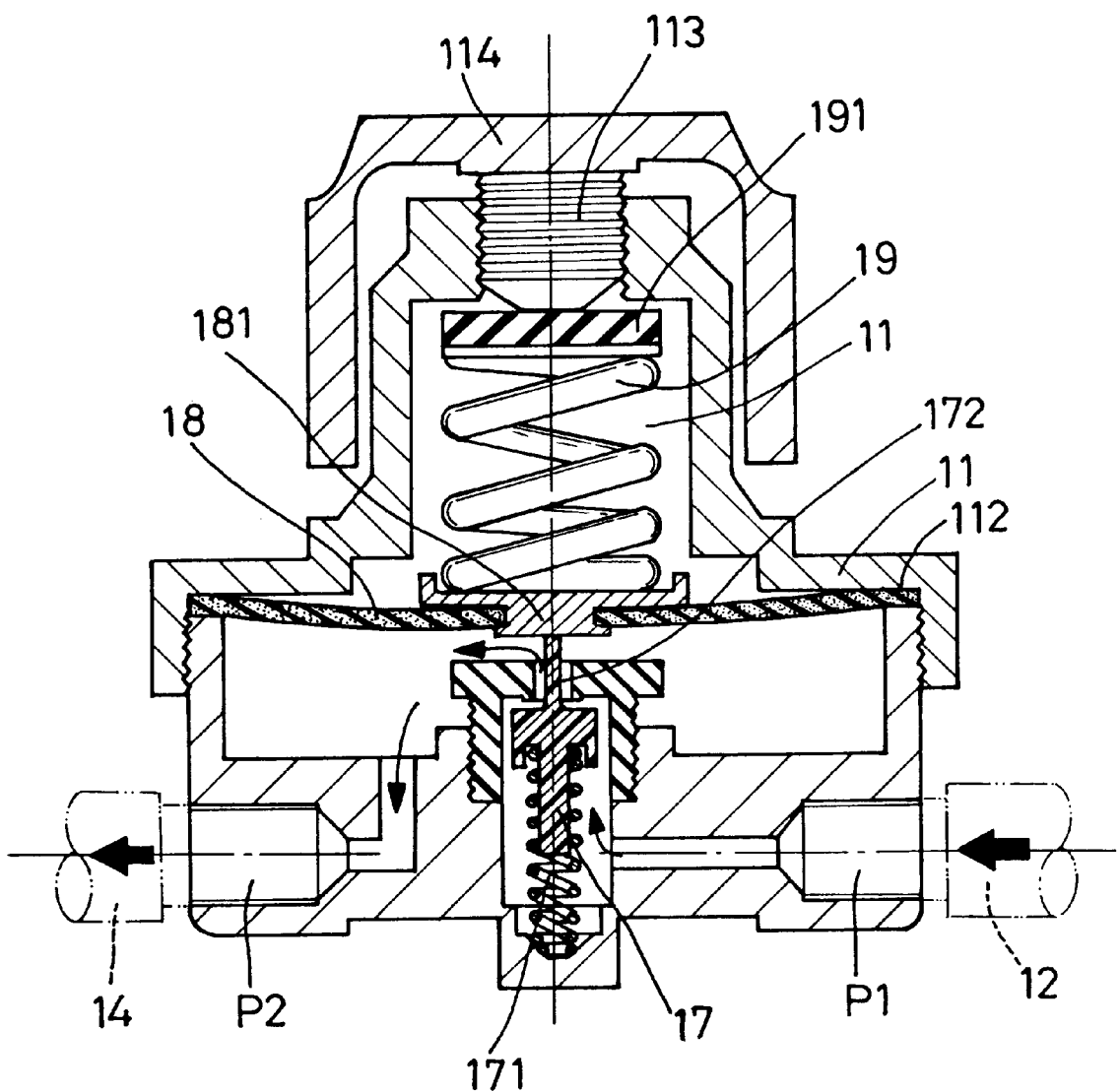
FIG. 3 is a longitudinal section of the conventional air pressure regulator, illustrating the valve in an open state.
Figure 4:
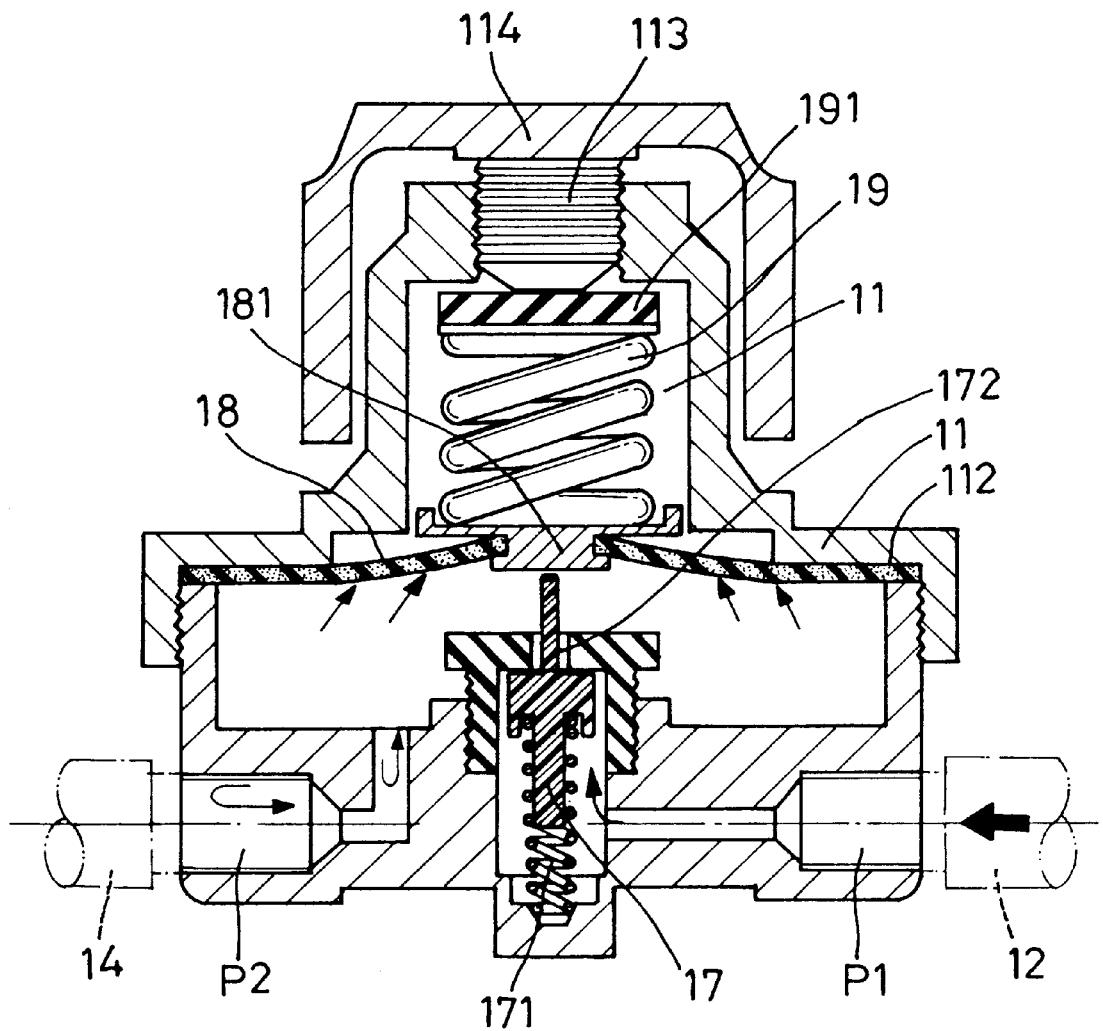
FIG. 4 is a longitudinal section of the conventional air pressure regulator, illustrating the valve in a close state.
Figure 5:
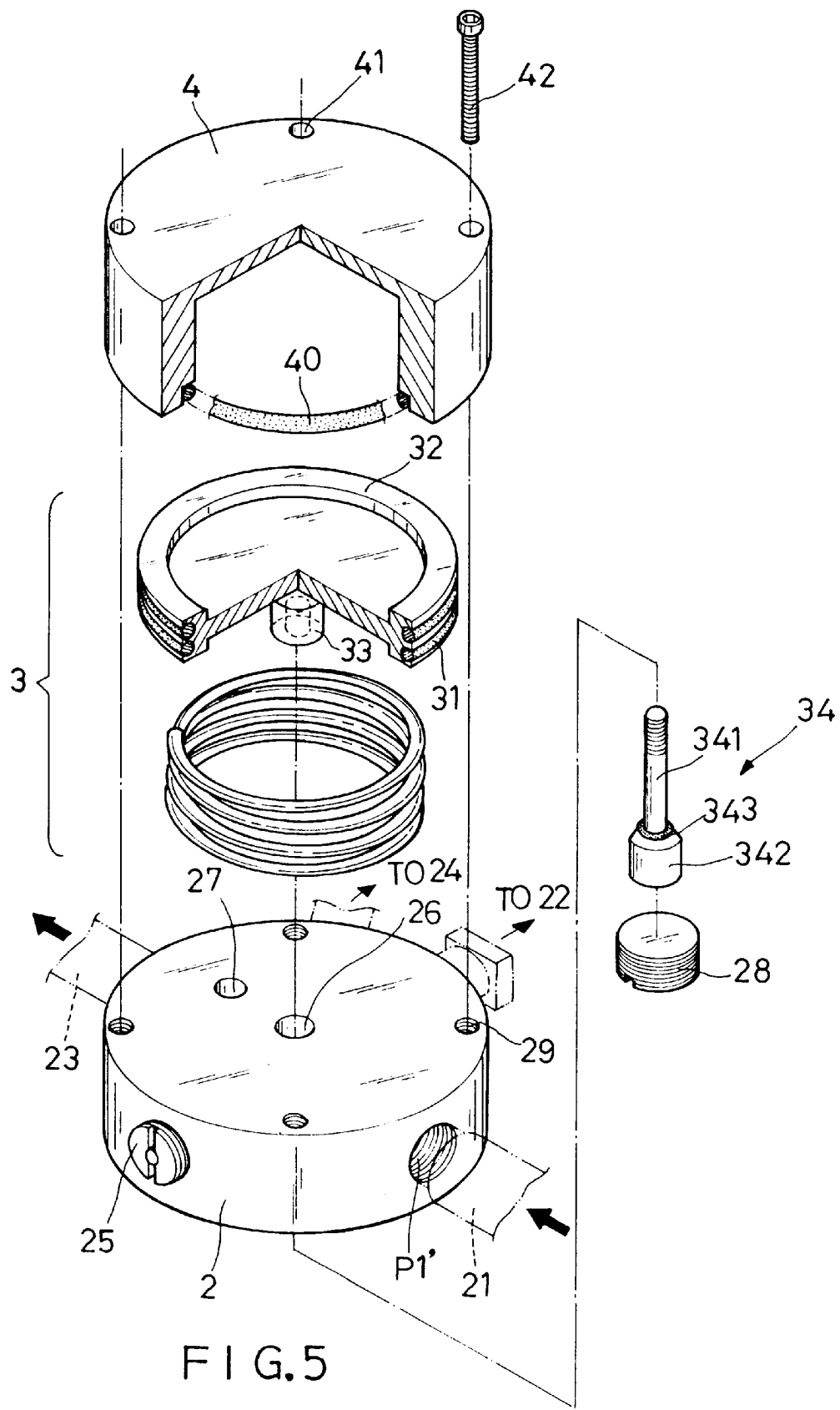
FIG. 5 is an exploded view of an applicable embodiment in accordance with the present invention.
Figure 8:
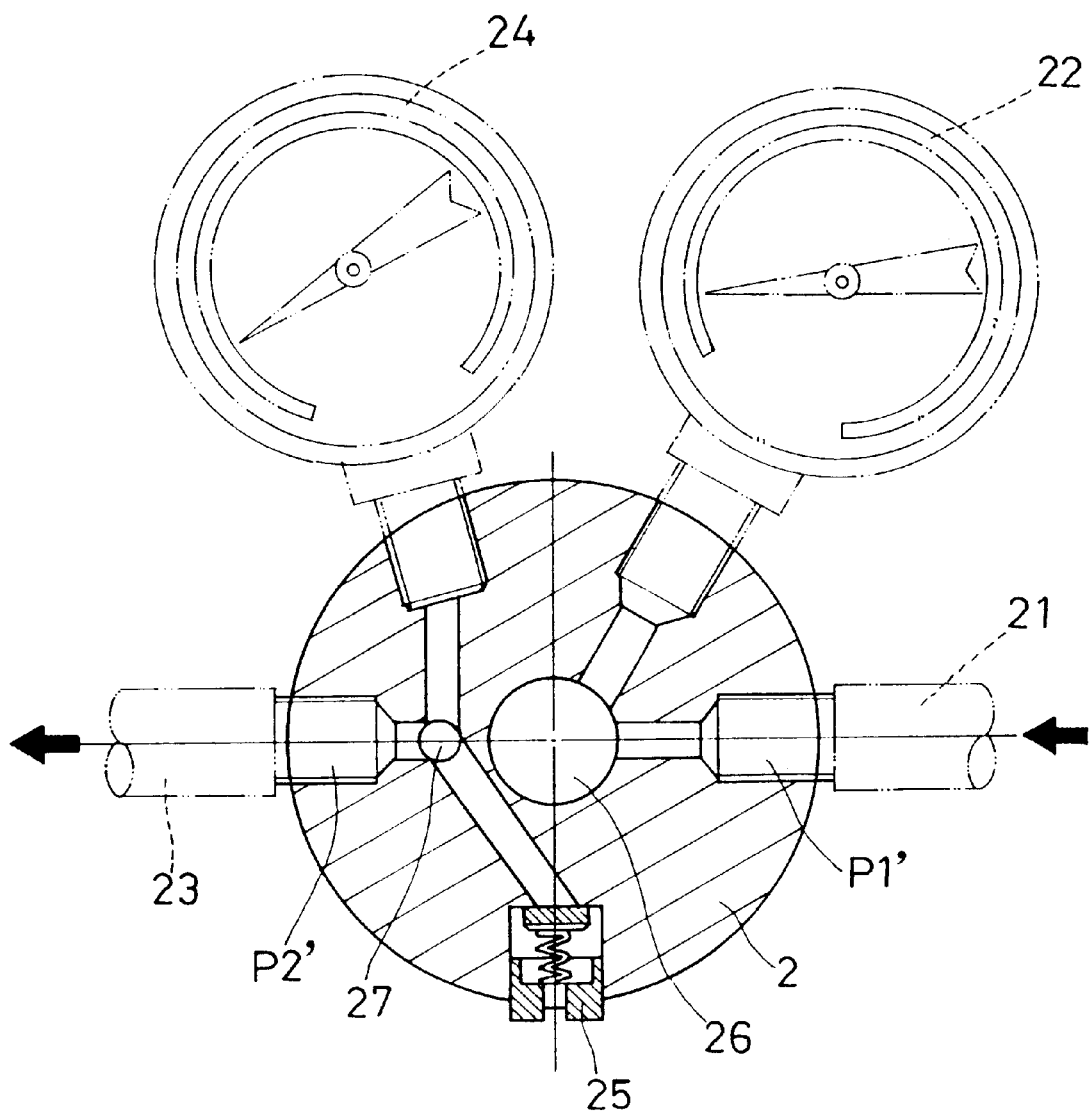
FIG. 8 is a cross section of the applicable embodiment in accordance with the present invention.

First of all, referring to FIGS. 5 through 8, an applicable embodiment of the present invention includes:

a main body 2 whose hollow internal part is divided into a primary pressure chamber P1' and a secondary pressure chamber P2', wherein the primary pressure chamber P1' can be connected with an air inlet pipe 21 and a primary pressure gauge 22 while the secondary pressure chamber P2' can be connected with an air outlet pipe 23, a secondary pressure gauge 22 and a safety decompression valve 25, and wherein the primary and secondary pressure chamber P1', P2' are respectively fitted with a through hole 26, 27 till the top of said main body so as to form a circulation route, and wherein the through hole 26 in a through state with the narrow upper part and the wide lower part, and whereby a sealing screw 28 is disposed at the bottom end thereof while a number of screw holes 29 are mounted on the top surface of the main body 2;

an upper cover 4 fitted with a number of screw holes 41 registering with the screw holes 29 of the main body 2 for inserting a number of screws 42 to fix the upper cover 4 on the main body 2, and an O-shaped ring 40 is mounted on a connecting surface of the main body 2; and a regulator 3 whose external periphery is fitted with a piston body 32 of an O-shaped ring 31 horizontally situated inside of the upper cover 4 and which comprises a positioning body 33 at the bottom face of the piston body 32 registering with the through hole 26 of the primary pressure chamber P1', and a plug assembly 34 is penetrating through the through hole 26 upwards and a mounting rod 341 thereof is screwed in a positioning body 33, wherein an O-ring 343 is disposed on a sealing plug 342 thereof and on the connecting face of the through hole 26, and a return spring 35 whose both ends are properly connected to the top face of the main body 2 and the bottom face of the piston body 32 respectively so that an appropriate distance D is reserved between the bottom face of the top of the upper cover 4 and the top face of the piston body 32 when the whole body is in a free motion state, and a clearance is formed between the plug assembly 34 and the through hole 26.

The above-mentioned return spring 35 can be fixed through welding or screwing on the bottom face of the piston body 32 and the top face of the main body 2 so as to create a resilient pull for the piston body 32.

Figure 9:
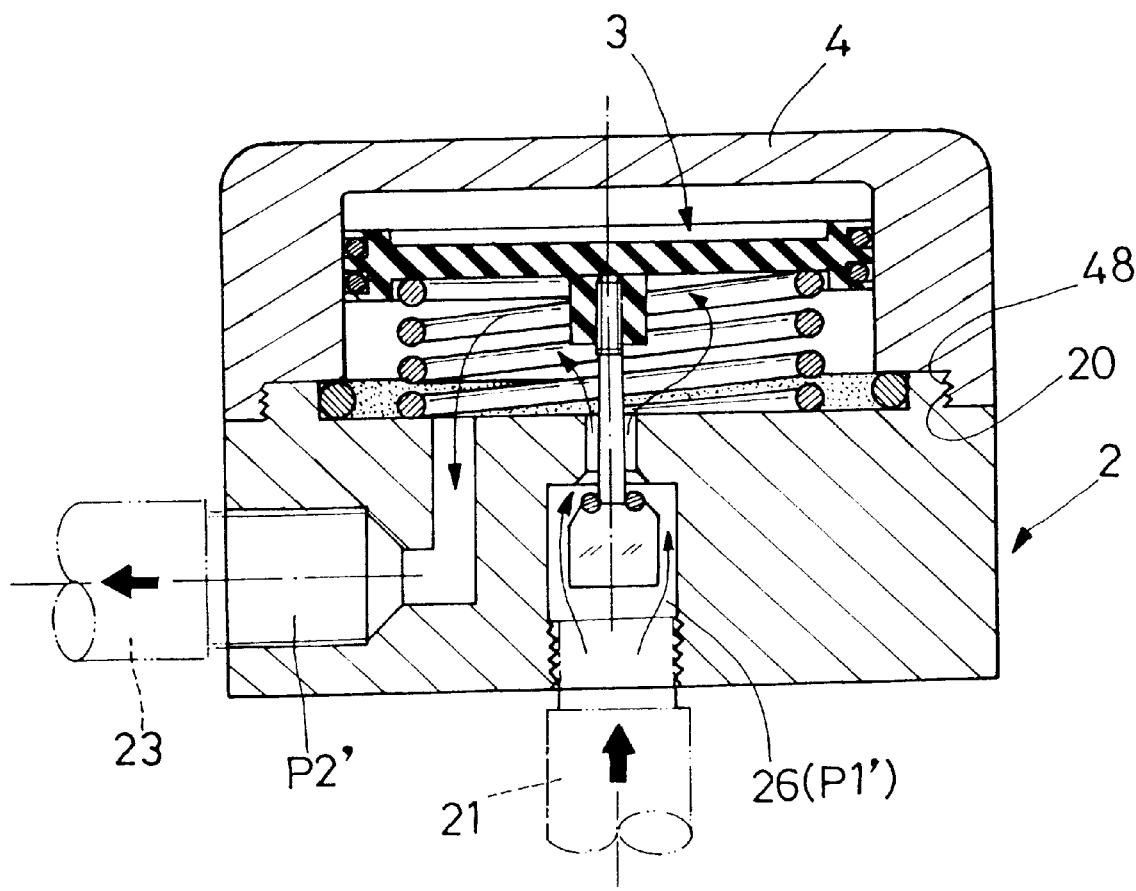
FIG. 9 is a longitudinal section of the applicable embodiment in accordance with the present invention, illustrating the through hole as air inlet pipe.

As shown in FIG. 9, after removing the sealing screw 28 of the through hole 26, the air inlet pipe 21 can be directly screwed at the position of the bottom face of the through hole 26 originally sealed by the sealing screw 28 without being provided with screw holes on the side face of the main body 2. The air can then be inducted through this position. At this time, the primary pressure chamber P1' is a space inside of the through hole 26. However, this is only the change of the position of the air inlet pipe 21, and it won't be described hereinafter. Furthermore, the upper cover 4 in accordance with the present invention can also be directly screwed in the thread 20 at the top of the main body 2 by means of the screw 48 at the bottom thereof. This is another applicable fixing way for the upper cover 4 in accordance with the present invention.

The above-mentioned embodiment is a fixed pressure regulator. In accordance with the requirement of the special industry, in its releasing, the end of the screw can be fine-adjusted in the screw hole inside of the positioning body 33 by means of the mounting rod 341 of the plug assembly 34 so as to control the position of the plug assembly 34 in the through hole 26 when the plug assembly 34 rises and so as to reach the aim of a fixed output of the secondary pressure. This kind of the fixed air pressure regulator is designed to meet requirements of the special industry, e.g. the air pressure regulator in accordance with the present invention is applicable to the requirement of the secondary output pressure at approx. 5 $kg/cm^2$ without necessary adjustment in the meantime.

Figure 10:
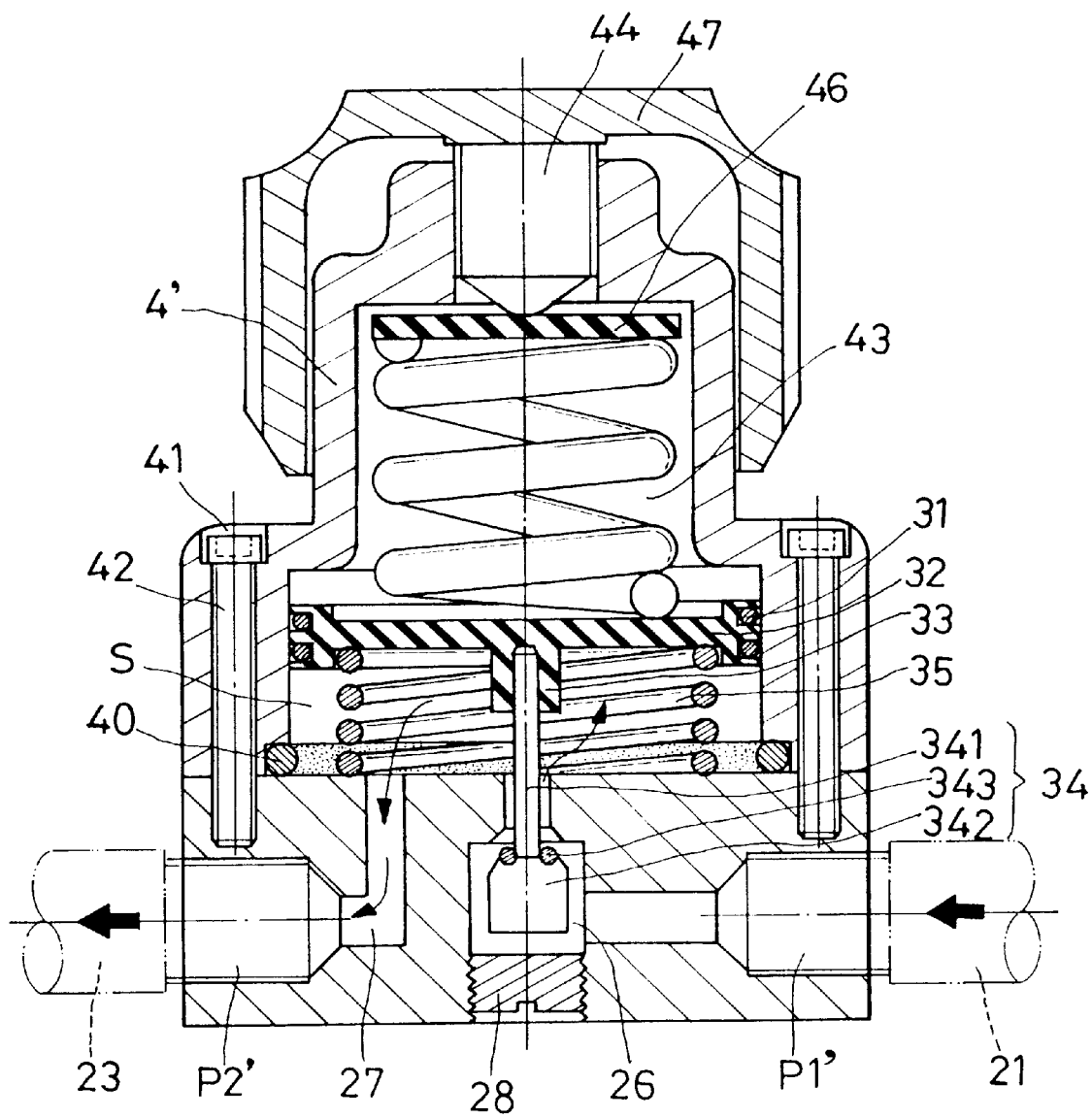
FIG. 10 is a longitudinal section of another applicable embodiment in accordance with the present invention.

Of course, most air pressure regulators include the secondary air pressure output adjusting element to meet different pressure requirements in the work procedure. FIG. 10 shows another embodiment of the present invention in which fine adjustment can be carried out. The middle of the upper cover 4' can be shaped with a protruding form, and the inner side is formed with an accommodation 43. The top of the upper cover 4' is fitted with a screw through hole so as to install an adjusting screw 44 to elongate into the hollow room 43 in which a spring 45 is disposed while the bottom end thereof is pushed against the top of the piston body 32. A packing piece 46 is fitted at the top end of the spring 45 for suppressing the adjusting screw 44. Surely, the adjusting screw 44 can be turned by means of a knob 47.

Again, please refer to FIGS. 6 through 8. In using the present invention, the gas flows out from the air outlet pipe 23 to lower the pressure of the secondary pressure chamber P2'. At this time, the return spring 35 is in a returning free state, so that the plug assembly 34 is taken and lowered by the piston body 32. On the other hand, the high-pressure gas passes through the air inlet pipe 21 into the primary pressure chamber P1'. The primary pressure can be measured by the primary pressure gauge 22. The high-pressure gas passes through the clearance between the plug assembly 34 and the through hole 26 into the closed room S formed by the piston body 32 and the main body 2. Thereafter, the high-pressure gas passes through the through hole 27 of the secondary pressure chamber P2' of the main body 2 into the secondary pressure chamber P2' and flows out through the air outlet pipe 23 for using. The secondary pressure can be measured by the secondary pressure gauge 22.

The greatest features and effects of the present invention are shown in FIGS. 6 and 7. Firstly, please refer to FIG. 6. When the high-pressure of the primary pressure chamber P1' enters into the closed room S formed by the piston body 32 and the main body 2 and the air outlet pipe 23 creates a returning pressure, the secondary pressure inside of the closed space S pushes the piston body 32 so that the plug assembly 34 will rise. At this time, the sealing plug 342 of the plug assembly 34 and the O-ring 343 are pushed against the through hole 26 to block the passage of the primary pressure chamber P1' to the closed space S in order to maintain an appropriate value of the secondary pressure. It is to note that the piston body 32 is solid and won't deform in the travel process which is different from the one made of conventional elastomer piece 18 which results in deformity. Moreover, the return spring 35 has a stable and balanced elasticity without the disadvantage of the bad-distributed force. Furthermore, the capacity of the closed space S is much larger than that of the space of the through hole 26 in the primary pressure chamber P1'. Therefore, the travel change of the piston body 32 is carried out by the secondary pressure inside of the closed space S, rather than by the primary pressure effect on the plug assembly 34 to push against the piston body 32. Accordingly, the change of the pressure difference in the primary pressure chamber P1' won't influence the travel of the piston body 32, so that the adjustment of the secondary pressure in accordance with the present invention is very accurate. However, the conventional air pressure regulator uses the elastomer piece 18 to push downwards against the valve assembly 17 with the negative regulating way. Besides, the valve assembly 17 suppressed by the elastic pressure of the small spring 171 will be influenced by the primary pressure difference. The present invention won't however be influenced by the amount of the primary pressure because 1. the coordination effect is created by the resilience of the return spring 35 and the air pressure; and
2. the rise of the piston body 32 is adjusted by the positive pressure while the plug assembly 34 is synchronically moved to rise.

Accordingly, the stability of the output of the secondary pressure can be enhanced. The more is the pressure in the secondary pressure chamber P2', the greater is its pressure against the piston body 32. At this time, the through hole 26 is sealed by the plug assembly 34 more firmly so that the safety will be ensured by means that the gas in the first pressure chamber P1' won't seep into the secondary pressure chamber P2'. Moreover, the conventional valve assembly 17 and the small spring 171 are easily aged, hardened etc. to result in an incomplete sealing and to cause danger.

Furthermore, the fine adjustment of the plug assembly 34 can be carried out to set a fixed secondary pressure output before release of the present invention. Therefore, it can be directly applied to the fixed air pressure regulator to meet the requirement of the special industry. As shown in FIG. 10, a spring 45 and an adjusting screw 44 can be disposed for randomly regulating the output value of the secondary pressure to meet requirements. For example, the secondary pressure of the regulator 3 is preset at a certain value. It means that the regulator elongates to a preset resilience height. And the plug assembly 34 will be synchronically moved by the plug assembly 34 to close the through hole 26. Accordingly, the preset output value of the secondary pressure can be maintained. When the secondary pressure is required to increase or decrease, the knob 47 is turned to make the adjusting screw 44 to change the resilient suppressing force of the spring 45 on the top of the piston body 32. Therefore, when the original secondary pressure in the closed space S pushes against the piston body 32, it must overcome the pressure of the spring 45 in addition to restoring the resilience of the spring 35. Accordingly, the output pressure value after adjustment can be obtained, and the greater is the resilience suppressing pressure of the spring 45 on the piston body 32, the greater is the secondary pressure output.

As for the detailed configuration of the main body 2, the primary pressure gauge 22, the secondary pressure gauge 24 and the safety decompression valve 25 belongs to the prior art, so that it won't be described more herein.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An air pressure regulator comprising:

a main body having a hollow internal portion divided into a primary pressure chamber and a secondary pressure chamber, said primary pressure chamber being connected to an air inlet pipe and said secondary pressure chamber being connected to an air outlet pipe and a safety decompression valve, said primary pressure chamber and said secondary chamber each being in fluid communication with a respective one of a pair of through holes formed through a top of said main body to form a circulation route between said primary and secondary pressure chambers, said through hole communicating with said primary pressure chamber passes through a bottom of said main body to form an opening in said bottom of said main body of larger diameter than an opening in said top of said main body;

a sealing screw disposed in said opening in said bottom of said main body:

an upper cover secured to said main body and having a cavity therein; and, a regulator fixed on said top of said main body by said upper cover, said regulator including (a) a piston body horizontally disposed in said cavity of said upper cover, (b) a positioning body disposed on a bottom face of said piston body in aligned relationship with said through hole communicating with said primary pressure chamber, (c) a plug assembly penetrating through said through hole communicating with said primary pressure chamber, said plug assembly including a mounting rod passing through said through hole communicating with said primary pressure chamber and threadedly engaged with said positioning body, and (d) a return spring having one end connected to said top of said main body and an opposing end connected to said bottom face of said piston body, a sufficient space being reserved between a bottom face of a top portion of said upper cover and a top face of said piston body when said piston body is in a free motion state, so that a clearance is formed between said plug assembly and said through hole communicating with said primary pressure chamber; said upper cover having a middle portion with a protruding form and an accommodation space formed in an inner side thereof, and wherein said top portion of said upper cover is fitted with a screw through hole so as to install an adjusting screw to elongate into said accommodation space in which a spring is disposed while a bottom end of said spring is pushed against said top face of said piston body, and wherein a packing piece is mounted at a top end of said spring for suppressing said adjusting screw.

* * * * *